July 16, 1940. L. R. SMITH Re. 21,510

CONTROL MECHANISM

Original Filed Nov. 29, 1933 2 Sheets-Sheet 1

INVENTOR
LEWIS R. SMITH
BY
ATTORNEY

July 16, 1940. L. R. SMITH Re. 21,510

CONTROL MECHANISM

Original Filed Nov. 29, 1933 2 Sheets-Sheet 2

WITNESSES:

R. J. Rizzo

James K. Mosser

INVENTOR

LEWIS R. SMITH

BY [illegible]

ATTORNEY

Reissued July 16, 1940 Re. 21,510

UNITED STATES PATENT OFFICE 21,510

CONTROL MECHANISM

Lewis R. Smith, Jackson, Mich., assignor to Westinghouse Electric & Manufacturing Company, East Pittsburgh, Pa., a corporation of Pennsylvania Original No. 2,049,329, dated July 28, 1936, Serial No. 700,319, November 29, 1933. Application for reissue May 4, 1937, Serial No. 140,678

18 Claims. (Cl. 62—6)

My invention relates to control systems for air conditioning devices which are operated in multiple, and it has for its object to provide an improved system of control.

While not so limited, my invention is more adaptable to small units, commonly referred to as room conditioners. Multiple operation of a plurality of such units from a common refrigerating machine is frequently desirable and it is to such operation that my invention applies. Air conditioning units of this type include, usually, an evaporator or cooling coil and a fan for conveying air thereover before delivering it to the space being cooled.

In practicing my invention, the cooling effect of the coil is preferably under control of an instrument responding to a condition of the air in the space being cooled, and is intermittently operated, while the fan operates continuously during the period that the unit is in an operable condition. A switch, preferably carried by the unit, is provided for rendering the unit operable or inoperable, which switch is manually operated. The refrigerating machine, which may be common to a plurality of units, is operated at times when any instrument calls for cooling and is stopped when all instruments are satisfied. The fans of all units continue to operate, however, as long as their respective units are in an operable condition as determined by the positions of the manually controlled switches associated therewith.

A further object of my invention is to provide a control system for a plurality of air cooling units operated from a common refrigerant source in which ventilation by each unit is provided during the full period that it is rendered operable, while cooling by the unit may be intermittently effected during this period.

These and other objects are effected by my invention, as will be apparent from the following description and claims taken in connection with the accompanying drawings, forming a part of this application, in which:

Figure 1:
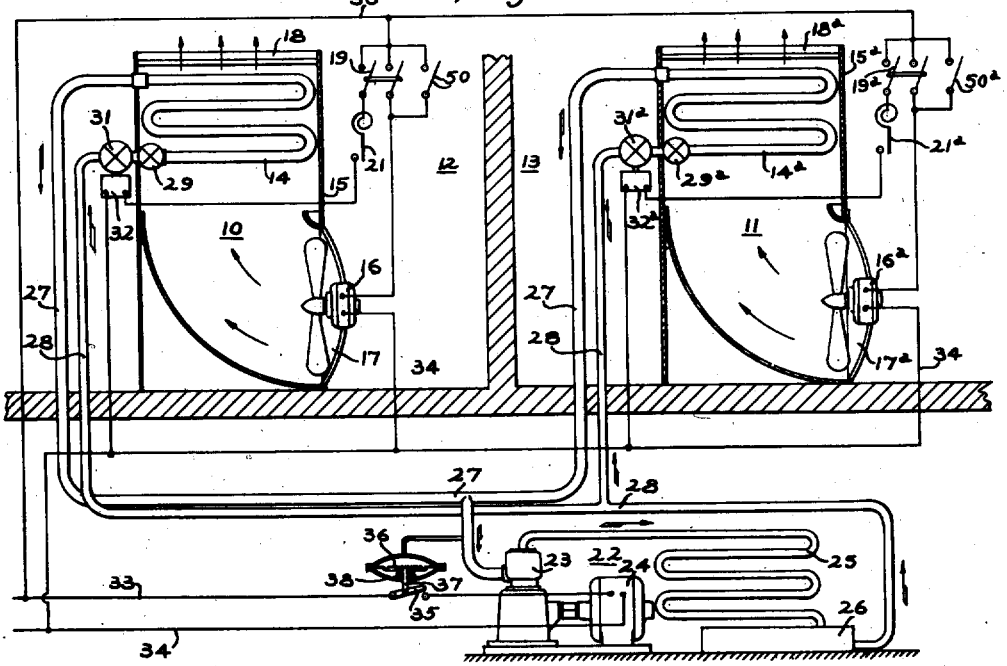
Fig. 1 is a diagrammatic view of a multiple air conditioning system embodying my novel control.

Reference will now be had to Fig. 1 in which first and second air conditioning units 10 and 11 are disposed to treat the air in the spaces 12 and 13, respectively. The units 10 and 11 are similar in construction; unit 10 including a cooling coil or evaporator 14 disposed within a casing 15 and a fan motor 16 mounted adjacent an inlet opening 17 formed in the casing 15. Air to be treated is drawn through the inlet opening 17 and conveyed in heat exchanging relation with the cooling coil 14 before being discharged through an outlet opening 18 to the space to be cooled.

A manually operated switch 19 for rendering the unit 10 operable or inoperable is located in a position where it may be readily operated at will. When the air conditioning unit rests on the floor as shown, the switch 19 is preferably carried by or disposed adjacent the casing 15. A thermostat 21 is preferably provided for the control of the cooling effect of the evaporator 14 and so disposed that changes in temperature of the air within the space 12 will be readily reflected therein. A switch 50 may be provided, so that operation of the fan alone is effected by the closing thereof without rendering the cooling apparatus operable.

The unit 11 includes elements corresponding to those described in connection with unit 10; the reference numerals for these elements being the same as those of unit 10 except that the exponent "a" has been added.

Refrigerant for the evaporators 14 and $14^a$ is preferably supplied by a refrigerating machine 22 of the compression type. The latter includes a compressor 23 driven by a motor 24 and arranged to discharge gaseous refrigerant into the condenser 25 where it is cooled and condensed. The latter may also include a storage reservoir 26 for liquefied refrigerant.

The system operates on the well known compression expansion cycle in which gaseous refrigerant which has been spent, is withdrawn from the evaporators 14 and $14^a$ through a branched conduit 27 by the compressor 23 which compresses it to a relatively high pressure in the condenser 25 wherein it is condensed and heat abstracted therefrom. Liquid refrigerant in the condenser 25 and reservoir 26 is then conveyed by branched conduit 28 to the evaporators 14 and $14^a$ in which it is vaporized at a relatively low pressure, abstracting heat therefrom in a well known manner. Expansion devices of conventional design, preferably valves 29 and $29^a$ are used to reduce the pressure at the terminals of the evaporators 14 and $14^a$ respectively. The cycle is then repeated.

The purpose of the thermostats 21 and $21^a$ is to maintain their respective spaces 12 and 13 at a predetermined temperature and are so arranged, that refrigerant is permitted to flow through the evaporators 14 and 14ᵃ when cooling is required. The control of the flow of refrigerant by the thermostats 21 and 21ᵃ is obtained, preferably, by the operation of valves 31 and 31ᵃ connected in the branched conduit 28. The valves 31 and 31ᵃ may be operated directly by the thermostats 21 and 21ᵃ respectively, but in this embodiment, I prefer to use electrically operated valves energized by the closing of the contacts of their associated thermostats. Accordingly solenoids 32 and 32ᵃ are provided for the valves which when energized operate to open the same and when deenergized permit the valves to close. As valves of this type are well known in the art no further description of their construction will be necessary.

The motor 24 of the refrigerating machine 22 is energized by conductors 33 and 34 leading to a source of power (not shown). A switch 35 is connected in one of the conductors for controlling the energization of the motor 24, which switch is of the pressure operated type. It includes a diaphragm 36 connected to the switch 35 by a link 37. The diaphragm 36 is subjected to the pressure of the gaseous refrigerant in the conduit 27 and is biased against this pressure by a spring 38. The pressure operated switch 35 is so arranged that the motor 24 is energized when the pressure in conduit 27 is above a predetermined value and is deenergized when said pressure is below this value.

Assuming the apparatus to be in the position shown in the drawings with switches 19, 19ᵃ, 50 and 50ᵃ in their open positions, and the pressure operated switch 35 open due to a low pressure existing in the conduit 27 from a previous cycle, and it is desired to initiate operation of unit 10. The switch 19 is closed and operation of the fan motor is initiated as a circuit is completed from the conductor 33, the switch 19, fan motor 16 to the conductor 34. Air for ventilation is conveyed by the fan motor 16 through the inlet opening 17 and is discharged through outlet opening 18 to the space 12. If the temperature of the air in the space 12 is above a predetermined degree the contacts of thermostat 12 are closed, completing a circuit from the conductor 33, switch 19, thermostat 21, solenoid 32 to the conductor 34. Energization of the solenoid 32 effects the opening of valve 31, whereby liquid refrigerant from the reservoir 26 is permitted to flow through the conduit 28, valve 31, expansion valve 29 to the evaporator 14. The pressure in the conduit 27 will rise due to vaporization of liquid refrigerant and, when a predetermined value is attained, will effect a downward movement of the diaphragm 36 against the bias of the spring 38. This downward movement of the diaphragm 36 is transmitted by the link 37 to the switch 35 closing the same to complete a circuit from the conductor 33 through the motor 24 to conductor 34. Operation of the refrigerating machine 22 is initiated and refrigerant is circulated through the evaporator 14 for abstracting heat therefrom as previously described.

Air conveyed by the fan motor 16 is now cooled before being delivered to the space 12. When the temperature of the air in the space 12 has been reduced to the desired degree, the thermostat 21 moves to open its contacts, thereby deenergizing the solenoid 32. The valve 31 closes so that the flow of refrigerant to the evaporator 14 is terminated. The compressor continues to operate momentarily until the pressure in the conduit 27 has been reduced to the predetermined value at which the switch 35 opens to deenergize motor 24.

The unit 11 is operated in the same manner as unit 10. Both units may be operated in parallel and, when the thermostat of one functions to terminate operation of its respective unit, the refrigerating machine 22 continues to operate as long as the evaporator of the other unit passes sufficient gas to the suction conduit 27 to maintain the pressure therein above the value necessary to effect opening of the switch 35.

Figure 2:
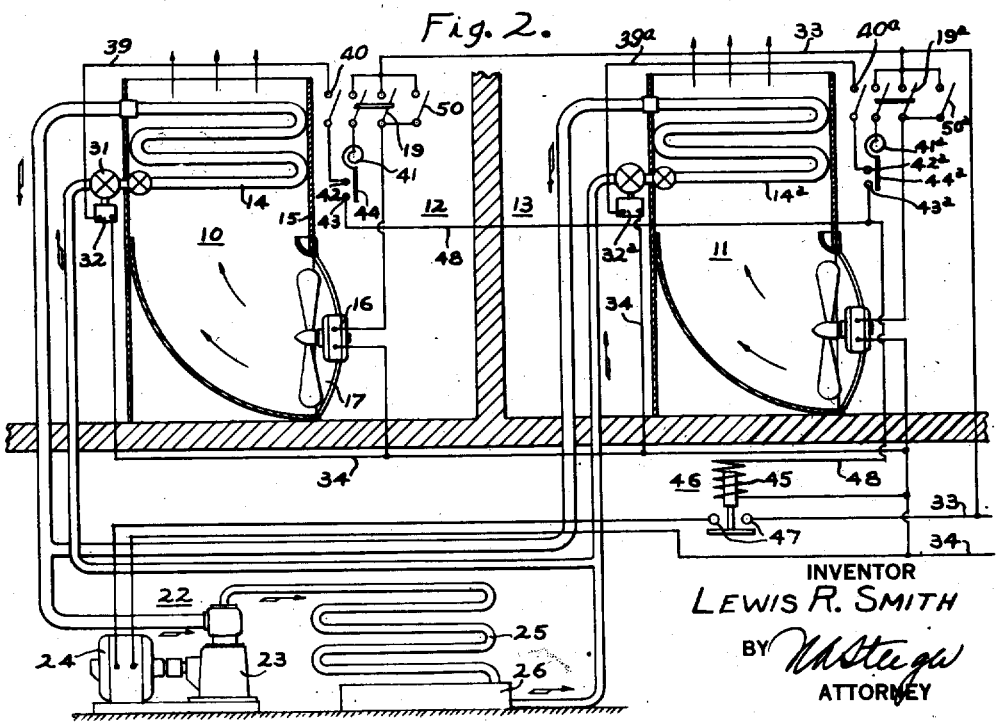
Figs. 2 and 3 are diagrammatic views of other embodiments of my invention; and—

With reference to Fig. 2, the air conditioning units disclosed therein are identical with the units 10 and 11 of Fig 1. In this embodiment theremostats 41 and 41ᵃ of the double pole type are used as the refrigerating machine 22 is controlled directly thereby, rather than by a pressure device in its suction line.

The thermostat 41 includes contacts 42 and 43 cooperating with a contact 44, which is moved in response to the temperature of the space 12. Contacts 42 and 42ᵃ are respectively connected, by conductors 39 and 39ᵃ, with solenoids 32 and 32ᵃ and contacts 43 and 43ᵃ are connected together and lead to the coil 45 of a relay 46. The relay 46 has contacts 47 connected in the circuit of the compressor motor 24. A switch 40 may be connected in the conductor 39 and opened when the switch 19 is opened, so as to prevent possible energization of the conductor 39 through the conductor 48 and thermostat 41 when the unit 11 is operating. A similar switch 40ᵃ may be connected in the conductor 39ᵃ. The operation of the apparatus in this embodiment is similar to that of Fig. 1.

As switch 19 of Fig. 2 is closed to initiate operation of its associated unit 10, a circuit from conductor 33 is completed through the switch 19, the fan motor 16 to the conductor 34. The fan motor 16 starts and air is circulated through the cabinet 15, to the space 12. If the temperature of the space 12 is above the degree to be maintained the contacts 42, 43 and 44 are in engagement completing a pair of parallel circuits, the first of which leads from conductor 33, switch 19, contacts 44 and 42, conductor 39, solenoid 32, to the conductor 34. The second circuit leads from conductor 33, switch 19, contacts 44 and 43, conductor 48, coil 45 of the relay 46, to conductor 34. Closing of these parallel circuits energizes solenoid 32 to open the valve 31 and the relay 46 to close the circuit to motor 24. Refrigerant flows through the circuit including the compressor 23, condenser 25 and evaporator 14 to effect cooling of the latter in the same manner as described in connection with Fig. 1.

As the air delivered by the fan motor 16 to the space 12 is cooled by the evaporator 14, the temperature of the air in space 12 will decrease and when a predetermined degree is reached the thermostat 41 moves to its open position with contacts 42, 43 and 44 disengaged. Deenergization of the solenoid 32 and relay 46 results, so that the refrigerating machine 22 ceases to operate and the flow of refrigerant through the evaporator 14 is terminated. Operation of unit 11 of Fig. 2 is effected in the same manner as unit 10, when its associated switch 19ᵃ is moved to the closed position.

Both units 10 and 11 in this embodiment may be operated in parallel by closing switches 41 and 41ᵃ and refrigerant will flow through evaporators 14 and 14ᵃ as long as their respective thermostats 41 and 41ᵃ are closed. When one of the units, for example, unit 10, has effected a reduction in air temperature in its respective space 12 the thermostat 41 opens. Closure of valve 31 is effected as described before, however, the refrigerating machine 22 continues to operate to circulate refrigerant through evaporator 14ᵃ, as the relay 46 remains energized by the circuit including conductor 33, switch 41ᵃ, contacts 44ᵃ and 43ᵃ, conductor 48, coil 45 of relay 46, and conductor 34.

Figure 3:
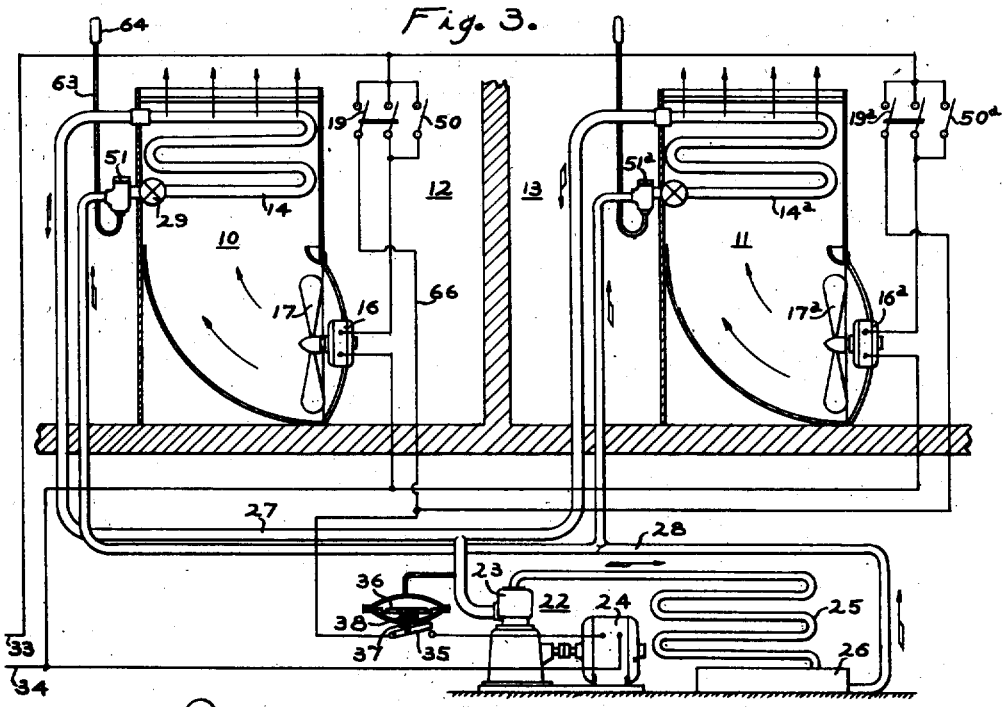
Figure 4:
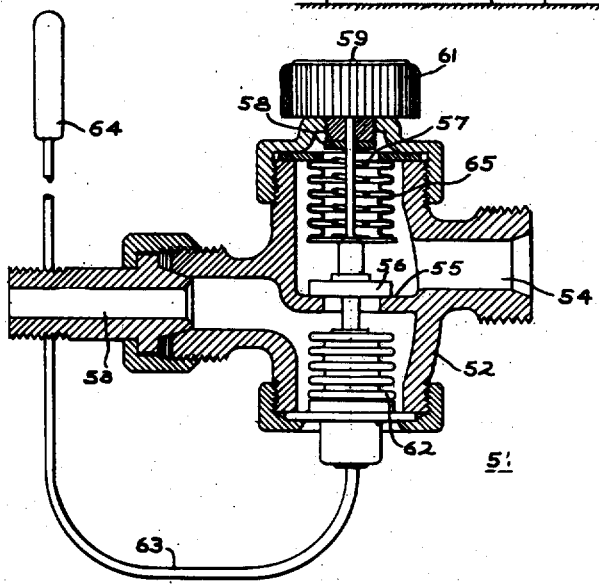
Fig. 4 is a sectional view of a thermally controlled valve used in the embodiment shown in Fig. 3.

Reference will now be had to Figs. 3 and 4 in which a further embodiment of my invention is disclosed. The air conditioning units 10 and 11 in this embodiment are similar to the units described in the previous embodiments. The electrically-operated valves 31 and 31ᵃ of Figs. 1 and 2 are not utilized in the present embodiment and are replaced by valves 51 and 51ᵃ operated directly by thermal elements which respond to variations in the temperature of the air in the space being cooled. The valves 51 and 51ᵃ are shown in detail in Fig. 4 and include a body portion 52 having inlet and outlet openings 53 and 54, respectively, for refrigerant being conveyed by the refrigerating machine 22 to the evaporator 14 or 14ᵃ. A valve seat 55 is formed in the body 52 for a valve 56, the latter being biased into engagement with the former by a spring 57. The upper end of the spring 57 engages a shoulder 58 formed by the screw 59 which is threaded in the body portion 52. The screw 59 may be provided with a knob 61 whereby the screw 59 may be rotated for varying the bias of the spring 57, so that the temperatures at which the valve 56 opens and closes may be varied.

The valve 56 is connected to an expansible device, such as the bellows 62, which is connected by a tube 63 to a bulb 64, all of which form an enclosed chamber for a fluid which expands and contracts with increases and decreases in temperature, such as a volatile fluid. Leakage of refrigerant through the upper portion of the valve body 52 may be prevented by a seal of the bellows type at 65.

The bulb 64 is disposed within the space, the air of which is being treated, and the spring 57 adjusted by means of the knob 61 so that the valve 56 is opened and closed at the temperature to be maintained. The operation is similar to that described in connection with Fig. 1 and is as follows. In Fig. 3, the switches 19—19ᵃ, 50 and 50ᵃ are shown in open position and the switch 35 is shown open, due to low pressure existing in the conduit 27 from a previous cycle. If unit 10 is to be operated, the double pole switch 19 is closed, completing a circuit from line conductor 33, through one pole of the switch 19, fan motor 16, to the other line conductor 34 and operation of the fan 17 is initiated. Air is circulated by the fan 17 through the unit 10 to the space 12. If the temperature of the air in the space 12 is above a predetermined degree as determined by the bias of the spring 57, the pressure in the bellows 62 will overcome the bias of the latter thereby raising the valve 56. Liquid refrigerant from the reservoir 26 will flow through the conduit 28, valve 51, expansion valve 29 to the evaporator 14. The pressure in the conduit 27 will rise due to vaporization of liquid refrigerant and, when a predetermined value is attained, will effect a downward movement of the diaphragm 36 against the bias of the spring 38. This downward movement of the diaphragm 36 is transmitted by the link 37 to the switch 35 closing the same to complete a circuit from the conductor 33 through the other pole of the switch 19, conductor 66, switch 35, motor 24 to the other line conductor 34. Operation of the refrigerating machine 22 is initiated and refrigerant is circulated through the evaporator 14 for abstracting heat therefrom as previously described.

Air conveyed by the fan 17 is now cooled before being delivered to the space 12. When the temperature of the air in the space 12 has been reduced to the desired degree, the pressure in the bellows 62 is insufficient to hold the valve 56 open against the bias of the spring 57 and the flow of refrigerant to the evaporator 14 is stopped. The compressor continues to operate momentarily until the pressure in the conduit 27 has been reduced to the predetermined value at which the switch 35 opens to deenergize motor 24. The fan 17 continues to circulate air through the unit 10 to the space 12 for ventilation. When the unit 10 is to be shut down, the switch 19 is opened thereby rendering both the fan 17 and the refrigerating machine 22 inoperable.

The unit 11 is operated in the same manner as unit 10 when its associated switch 19ᵃ is closed. Both units may be operated in parallel and, when the thermostat of one functions to stop the flow of refrigerant thereto, the refrigerating machine 22 continues to operate as long as the evaporator of the other unit passes sufficient gas to the suction conduit 27 to maintain the pressure therein above the value necessary to effect opening of the switch 35. It will be seen also that in this embodiment, as in the others, the fans 17 and 17ᵃ may be operated for ventilation without cooling by closing their respective switches 50 and 50ᵃ.

In all embodiments, it will be seen that the fan motors operate continuously, as long as their respective switches are closed, but that refrigerant is circulated through the evaporators only when their associated thermostats call for cooling. Also, the refrigerating machine 22 operates as long as any thermostat calls for cooling and only ceases to operate when all thermostats are satisfied.

While I have shown my invention in several forms, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a control system for air conditioning apparatus, the combination of a plurality of air cooling devices, a refrigerating machine common to said devices for supplying liquid refrigerant thereto, means for conveying gaseous refrigerant from the devices to said machine, means responsive to a pressure condition of the gaseous refrigerant conveyed from the devices for initiating and terminating operation of the machine to maintain said pressure condition between predetermined values, a valve for controlling the flow of liquid refrigerant to one of said cooling devices independently of the flow of liquid refrigerant to the remaining device or devices, means associated with said one cooling device for controlling said valve in response to a condition of the air in the space cooled by the device, switching means associated with said one cooling device for rendering the last-mentioned means individually operable and inoperable, and means operable automatically to circulate air through said one cooling device individually for ventilation during the full period that the associated valve controlling means is rendered operable by the switching means.

2. In a control system for air conditioning apparatus, the combination of a plurality of air cooling devices, a refrigerating machine common to said devices for supplying liquid refrigerant thereto, means for conveying gaseous refrigerant from the devices to said machine, means responsive to a pressure condition of the gaseous refrigerant conveyed from the devices for initiating and terminating operation of the machine to maintain said pressure condition between predetermined values, a valve for controlling the flow of liquid refrigerant to one of said cooling devices independently of the flow of liquid refrigerant to the remaining device or devices, means associated with said one cooling device for controlling said valve in response to the cooling demand upon said one cooling device, switching means associated with said one cooling device for rendering the last-mentioned means individually operable and inoperable, and means operable automatically to circulate air through said one cooling device individually for ventilation during the full peroiod that the associated valve controlling means is rendered operable by the switching means.

3. In a control system for air conditioning apparatus, the combination of a plurality of air cooling devices, a refrigerating machine common to said devices for supplying liquid refrigerant thereto, a conduit connecting said devices and said machine for conveying gaseous refrigerant from the former to the latter, means responsive to the pressure of the refrigerant in said conduit for controlling the operation of the machine to maintain said pressure between predetermined values, a valve for controlling the flow of liquid refrigerant to one of said cooling devices independently of the flow of liquid refrigerant to the remaining device or devices, means associated with said one cooling device for controlling said valve in response to a condition of the air in the space cooled by the device, a switch associated with said one cooling device for rendering the last-mentioned means individually operable or inoperable, and means operable automatically to convey air through said one cooling device individually for ventilation during the full period that the associated valve controlling means is rendered operable by the switch.

4. In a control system for air conditioning apparatus, the combination of a plurality of air cooling devices, means for providing a supply of liquid refrigerant for said cooling devices, means associated with at least one cooling device for controlling the supply of refrigerant thereto and for initiating and terminating operation of the refrigerant supply means, means for circulating air through the air cooling device for ventilation, and a double pole switch having one pole for controlling the second-mentioned means and a second pole for controlling the air circulating means.

5. In a control system for air conditioning apparatus, the combination of a plurality of air cooling devices, means for providing a supply of liquid refrigerant for said cooling devices, means associated with at least one cooling device for controlling the supply of refrigerant thereto and for initiating and terminating operation of the refrigerant supply means in response to a condition of the air in the space cooled by the device, means for circulating air through the air cooling device for ventilation, and a double pole switch having one pole for controlling the second-mentioned means and a second pole for controlling the air circulating means.

6. In a control system for air conditioning apparatus, the combination of a plurality of air cooling devices, a refrigerating machine for providing a supply of liquid refrigerant for said air cooling devices, a valve associated with at least one cooling device for controlling the flow of refrigerant thereto, means responsive to the temperature of the air cooled by said one device for opening and closing said valve and for controlling the operation of the refrigerating machine, a fan for circulating air through the air cooling device for ventilation and a double pole switch having one pole for controlling said temperature responsive means and a second pole for controlling the fan.

7. In a control system for air conditioning apparatus, the combination of a plurality of air cooling devices, means providing a supply of liquid refrigerant for said cooling devices, means associated with one cooling device for controlling the supply of refrigerant thereto, means for circulating air through the cooling device, a manually-operated two-pole switch for controlling the operation of said one cooling device, means including a circuit connected to one pole of said switch and temperature-responsive means in said circuit for controlling the refrigerant supply controlling means, and means including a second circuit connected to the other pole of said switch for controlling the air circulating means.

8. In a control system for air conditioning apparatus, the combination of a plurality of air cooling devices, common means for providing a supply of liquid refrigerant for said cooling devices, means associated with at least one cooling device for initiating and terminating operation of the refrigerant supply means, means for circulating air through the air cooling device for ventilation, and a double pole switch having one pole for controlling the second-mentioned means and a second pole for controlling the air circulating means.

9. In a control system for air conditioning apparatus, the combination of a plurality of air cooling devices, means providing a supply of liquid refrigerant for said cooling devices, means associated with one cooling device for controlling the supply of refrigerant thereto, means for circulating air through the cooling device, a manually-operated two-pole switch for controlling the operation of said one cooling device, means including a circuit connected to one pole of said switch for controlling the refrigerant supply controlling means, and means including a second circuit connected to the other pole of said switch for controlling the air circulating means.

10. In a control system for air conditioning apparatus, the combination of a plurality of air cooling devices, a refrigerating machine common to said devices for supplying liquid refrigerant thereto, means for circulating air through one of said cooling devices, means associated with said one cooling device for controlling the supply of liquid refrigerant thereto in response to a condition of the air in the space cooled by said device, a switch for rendering the last-mentioned means operable or inoperable, means including a circuit controlled by said switch for rendering the air circulating means effective during the full period that the refrigerant supply controlling means is rendered operable by the switch, and a second switch for rendering the air circulating means effective.

11. In a control system for air conditioning apparatus, the combination of a plurality of air cooling devices, means providing a supply of liquid refrigerant for said cooling devices, means responsive to the temperature of the air cooled by one of said devices for controlling the supply of refrigerant thereto, means associated with said one cooling device for initiating and terminating operation of the refrigerant supply means, means for circulating air through said air cooling device for ventilation, and a double pole switch having one pole for controlling the third mentioned means and a second pole controlling the air circulating means.

12. In a control system for air conditioning apparatus, the combination of an air cooling device, a refrigerating machine for supplying liquid refrigerant to said device, means for circulating air through the cooling device, means associated with the cooling device for controlling the supply of liquid refrigerant thereto in response to a condition of the air in the space cooled by the device, a switch for rendering the last-mentioned means operable or inoperable, means including a circuit controlled by said switch for rendering the air circulating means effective during the full period that the refrigerant supply controlling means is rendered operable by the switch, and a second switch for rendering the air circulating means effective.

13. In a control system for air conditioning apparatus, the combination of a plurality of air cooling devices; a refrigerating machine for withdrawing gaseous refrigerant from the devices and for providing a supply of liquid refrigerant therefor; an electrical circuit for said machine; a conduit for conveying the gaseous refrigerant withdrawn by the refrigerating machine; a switch operated in response to the pressure in said conduit and connected in said electrical circuit; and each air cooling device having means responsive to the condition of the air in the space cooled by the device for controlling the supply of refrigerant to the device, means for circulating air through the device for ventilation, and a switch having one pole controlling said electrical circuit and a second pole for controlling the operation of the air circulating means.

14. In air conditioning apparatus, the combination of a plurality of air cooling devices; a refrigerating unit for providing a supply of liquid refrigerant for said cooling devices; each air cooling device having a valve for controlling the supply of liquid refrigerant thereto, means for circulating air through the air cooling device, a double-pole manually operated switch, a circuit controlled by one pole of said switch for effecting operation of the air circulation means, a second manually-operated switch connected in shunt with said one pole, a double contact thermostatic switch connected to the other pole of the double-pole switch, and a circuit controlled by one of said contacts for controlling said valve; and a circuit adapted to be energized by the other contact of any of said thermostatic switches for effecting operation of said refrigerating unit.

15. In air conditioning apparatus, the combination of a plurality of air cooling devices; a refrigerating unit for providing a supply of liquid refrigerant for said cooling devices; each air cooling device having a valve for controlling the supply of liquid refrigerant thereto, means for circulating air through the air cooling device, a double contact thermostatic switch, and a circuit controlled by one of said contacts for controlling said valve; and a circuit adapted to be energized by the other contact of any of said thermostatic switches for effecting operation of said refrigerating unit.

16. In air conditioning apparatus, the combination of a plurality of air cooling devices; a refrigerating unit for providing a supply of liquid refrigerant for said air cooling devices, said unit comprising a motor-driven compressor and a condenser; a circuit for effecting operation of said compressor; and each air cooling device having a valve for controlling the supply of liquid refrigerant thereto, a circuit for controlling said valve, a fan for circulating air in heat exchange relation with the air cooling device, a circuit for energizing said fan, a thermostatic switch having a first contact connected to said valve circuit and a second contact connected to said compressor circuit, and manually operated switch means for said circuits, said switch means being so constructed and arranged that the associated fan circuit is energized to effect continuous operation of the fan at all times that said manually operated switch means conditions said valve and compressor circuits to effect opening of the associated valve and operation of the compressor in response to the action of said thermostatic switch.

17. In air conditioning apparatus, the combination of a plurality of air cooling devices; each of said devices embodying a refrigerant evaporator, a fan for translating air in heat exchange relation with the evaporator, an electrically operated valve for controlling the supply of refrigerant to the evaporator and a thermostat for controlling said valve; a common refrigerating unit for supplying refrigerant to the evaporators; a manually operated switch associated with each cooling device; and means responsive to actuation of any one of said switches for effecting continuous operation of its associated fan and thermostatic operation of its associated evaporator and of the compressor.

18. In air conditioning apparatus, the combination of a plurality of air cooling devices and a common refrigerating machine for supplying refrigerant thereto, each of said air cooling devices including an evaporator and a fan for translating air over the evaporator, and being provided with an electrically operated valve for controlling the supply of refrigerant from the refrigerating machine to the evaporator, a thermostat for controlling said valve and for effecting operation of the refrigerating machine simultaneously with opening of the valve, and switch means manually adjustable to a plurality of settings, said switch means being constructed and connected so that it effects operation of the fan at all times that it renders the thermostat effective and so that in one setting it effects continuous operation of the fan and renders the thermostat effective to control said valve and the operation of the refrigerating machine, in a second setting it effects operation of the fan without rendering the thermostat effective, and in a third setting it terminates operation of the fan and does not render the thermostat effective.

LEWIS R. SMITH.